June 27, 1939. V. E. PEARSON 2,163,914
FISHING REEL
Filed March 15, 1938
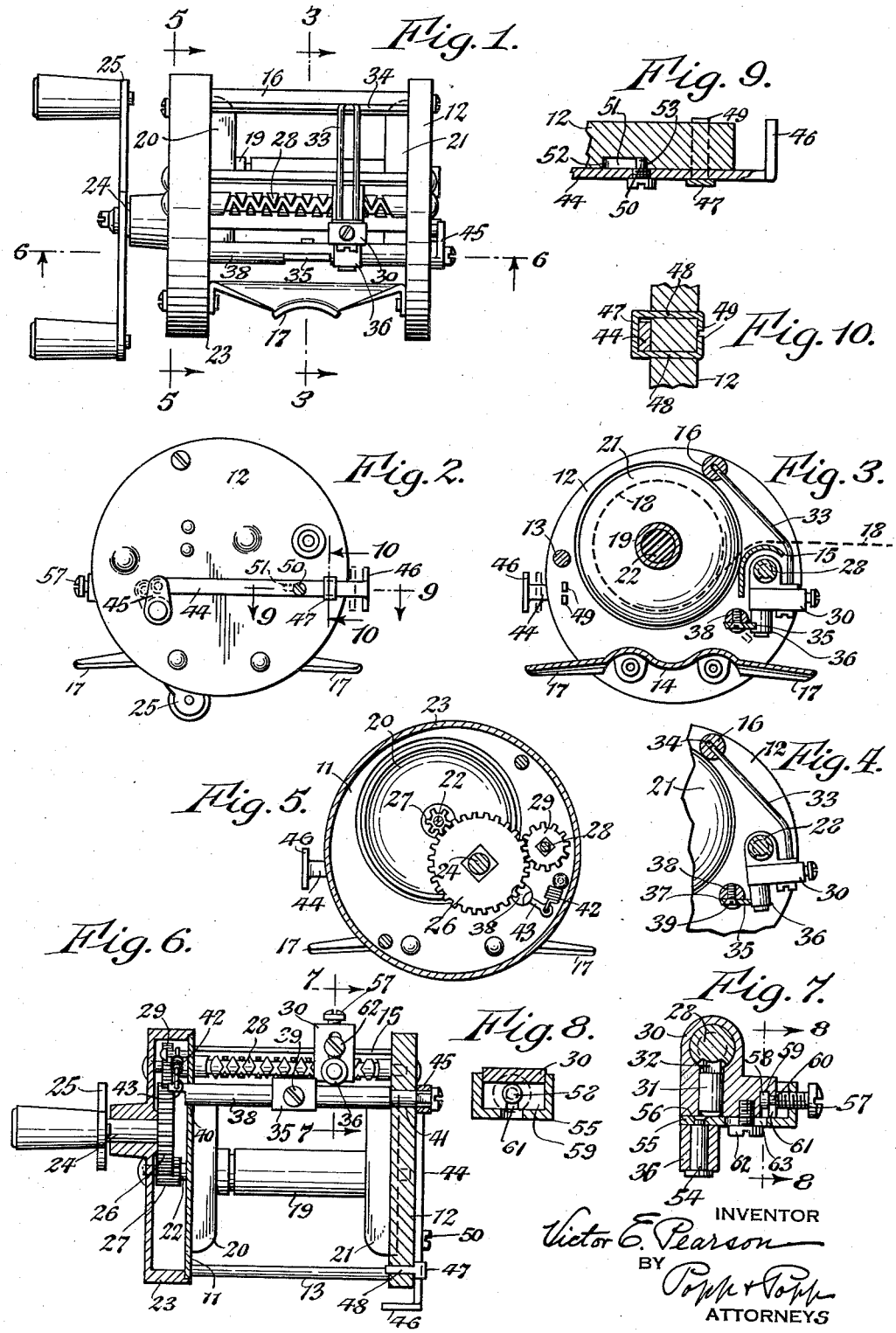
INVENTOR
Victor E. Pearson
BY
Popp & Popp
ATTORNEYS Patented June 27, 1939

2,163,914

UNITED STATES PATENT OFFICE 2,163,914

FISHING REEL

Victor E. Pearson, Buffalo, N. Y.

Application March 15, 1938, Serial No. 196,027

10 Claims. (Cl. 242—84.5)

This invention relates to a fishing reel and more particularly to means for preventing back-lash of the line when casting the bait or plug which is attached to the same.

The object of this invention is to provide means for preventing back-lash of the line which can be incorporated in the standard types of fishing reels now on the market without requiring any material alteration in the same, also to provide means of this character which are of simple and compact construction so that the overall dimensions of the reel are not increased, also to so construct this non-back-lash mechanism that the same imitates the thumbing action which is now usually employed for preventing back-lash of the line and also to so organize this mechanism that the same can be rendered operative and inoperative to suit the particular conditions under which the reel is being used.

In the accompanying drawing:

Fig. 1 is a front view of a fishing reel embodying these improvements.

Fig. 2 is an end view of the same from the right hand end of the reel.

Fig. 3 is a vertical section taken on line 3—3, Fig. 1 looking in the direction of the arrows associated with this line and showing the mechanism in one position.

Fig. 4 is a fragmentary view similar to Fig. 3 but showing the mechanism in another position.

Fig. 5 is a vertical section taken on line 5—5, Fig. 1.

Fig. 6 is a horizontal section of the reel taken on line 6—6, Fig. 1 looking upwardly.

Fig. 7 is a vertical transverse section on an enlarged scale, taken on line 7—7, Fig. 6.

Fig. 8 is a vertical section taken on line 8—8, Fig. 7.

Fig. 9 is a fragmentary section, on an enlarged scale taken on line 9—9, Fig. 2.

Fig. 10 is a fragmentary section on an enlarged scale, taken on line 10—10, Fig. 2.

In the following description similar characters of reference indicate like parts in the several figures of the drawing:

Although this invention may be embodied in fishing reels which are variously constructed, that shown in the drawing is an example of one which is suitable for use in connection with these improvements and as there shown this reel in its general organization is constructed as follows:

The main frame of this reel which supports the various movable parts comprises two end heads or plates 11, 12 preferably of circular form which are arranged vertically and spaced apart horizontally and a plurality of horizontal pillars or bars 13, 14, 15, 16 which are connected at opposite ends with the frame plates. The bar 13 serves the sole function of a frame pillar while the bar 14 serves the added purpose of carrying the saddles 17 forming part of the means whereby the fishing reel is attached to the fishing rod or pole, the bar 15 also serves as a guard for preventing that part of the line 18 between the spool and the level-winding mechanism from interfering with the operation of the latter, and the bar 16 also serves as a guide for one of the elements of the line-laying or level-winding mechanism.

In the space within the end plates and longitudinal bars of the main frame is arranged a spool upon which the fish line 18 is wound, which spool has a hub 19 of small diameter and end heads 20, 21 of large diameter for confining the line on the spool. The hub of this spool is mounted on a shaft 22 which is journaled at its opposite ends in bearings, one of which is formed in the end plate 12 of the frame while the other is formed on a cap or casing 23 which is secured to the outer side of the frame plate 11. Manual rotation of the reel may be effected in various ways, for instance by the means which are shown in Figs. 1, 5, and 6 and which comprise a driving shaft 24 journaled in a bearing formed in the cap or casing 23, a crank 25 secured to the outer end of the driving shaft, and a driving gear wheel 26 of comparatively large diameter secured to the inner end of the driving shaft and meshing with a small gear pinion 27 on the adjacent end of the spool shaft.

Line-laying or level-winding means are provided for causing the line upon being wound on the hub of the spool to be distributed evenly over the length of the same which means may be of various constructions, those shown in the drawings comprising a longitudinal double-thread leveling screw 28 arranged on one side of the spool and journaled at its opposite ends in the frame plate 12 and the casing or cap 23 and provided within the latter with a gear pinion 29 which meshes with the driving gear wheel 26 so that upon turning the crank 25 this leveling screw will be turned simultaneously with the line-carrying spool. The numeral 30 represents a traveler or carriage which is mounted on the leveling screw 28 and adapted to reciprocate lengthwise thereof and also capable of turning slightly thereon. The longitudinal movement of this traveler on the leveling screw is effected by means of a tracer or pawl 31 pivoted on the traveler and provided with a tooth 32 which engages with the thread of the leveling screw and causes the traveler to move alternately in opposite directions on this screw as the latter is rotated. To the outer side of the traveler is secured one end of a resilient guide loop 33 through which passes the adjacent part of the fish line so that the same upon being wound on the spool, during the winding rotation of the latter, will be distributed evenly over the length of this spool due to the simultaneously reciprocating movement of the traveler and its guide loop in a direction parallel with the axis of the spool in a well known manner. The traveler is capable of a slight rotation on the leveling screw but permitted to slide lengthwise thereof by slidingly engaging the outer end of the line guide loop 33, which is preferably made of spring wire, with a longitudinal guide groove or channel 34 formed in the adjacent pillar 16 of the main frame which serves as a guide bar for this purpose.

It is well known that the spool when rotating at a certain speed in the direction for unwinding the line therefrom will pay out a greater length of line during the first of this unwinding movement than during the latter part thereof due to the fact that the diameter of the body of line on the spool during the early part of the unwinding movement is greater than its diameter during the latter part of this movement. Unless, therefore, the first part of the unwinding movement of the spool is checked and the latter part of this movement is accelerated a greater amount of line is liable to be paid off from the spool when making a cast of the bait or plug which is attached to the line and thereby cause part of the line to double or fold upon itself so as to produce an objectionable backlash of the spool which will snarl or tangle the line. During the latter part of the cast paying out of the line may be materially retarded due to the fact that the body of line on the spool at this time is of comparatively small diameter, thus materially shortening the distance that the bait is cast as compared with the distance which could be reached if the spool were free to rotate during the latter part of the cast.

Heretofore the unwinding rotation of the spool for controlling the same has usually been accomplished by pressure of the fisherman's thumb on the surface of the body of line on the spool, which operation is commonly known as "thumbing". The control of the unwinding rotation of the line from the spool in this manner, however, is uncertain and is usually only accomplished by persons who have become skillful by long practice and experience.

The present invention provides means which operate automatically to effect a braking operation intermittently on the unwinding rotation of the spool and which simulates the "thumbing" operation heretofore applied to the spool during the first part of the unwinding rotation of the same and also provides means whereby this braking effect may be eliminated and permit the spool to rotate freely in the unwinding direction during the latter part of this movement, thereby preventing back-lash action of the spool during the first part of its unwinding movement and also releasing the spool during the latter part of its unwinding movement so as to increase the distance which the bait may be thrown while completing the cast, whereby a greater area of the water can be covered than otherwise would be possible.

The preferred means whereby this purpose is accomplished in accordance with the present invention are constructed as follows:

The numeral 35 represents a brake or deflecting cam which is arranged on one side of the spool and adjacent to the inner side of the line-laying traveler and which is adapted to be engaged by a tappet 36 on the outer side of this traveler during the reciprocating movement of the latter. This brake cam is preferably constructed of a metal plate which is secured in a notch 37 in the central part of a brake shaft 38 by means of a screw 39 so that this cam projects laterally from this shaft. The brake shaft is arranged parallel with the axes of the spool and the screw shaft 28 and turns at its opposite ends in bearings 40, 41 formed in the frame plates 11, 12, as best shown in Fig. 6. Upon turning the brake shaft in one direction the brake cam 35 is shifted into the path of the tappet so that the latter during its reciprocating movement imparted thereto by the screw shaft will cause the traveler or carriage 30 to be turned slightly relative to the screw shaft and thereby increase the frictional engagement of the guide loop 33 with the guide bar 16, whereby the rotation of the spool is momentarily retarded, but after the tappet clears this brake cam the reduced or normal frictional engagement of the guide loop with the guide bar 16 will be restored, thereby eliminating the braking effect on the spool and permitting the latter to again rotate without any added restraint. Upon turning the brake shaft in the opposite direction the brake cam will be moved out of the path of the tappet 36 and thereby permit the line-laying traveler or carriage to reciprocate freely under the action of the screw shaft without any interference from the brake mechanism during its reciprocating movement and thereby avoiding subjecting the spool to any intermittent retarding action.

The turning or rocking movement of the brake shaft in the direction for carrying the brake cam into the path of the tappet 36 is preferably effected by means of a spring 42 arranged within the cap or casing and connected at one end with a crank 43 on the adjacent end of the brake shaft 38 while the opposite end of this spring is connected with some stationary part of the frame, for example, the adjacent part of the frame plate 11, as best shown in Figs. 5 and 6. The turning movement of the brake shaft in the opposite direction is effected manually by means which comprise a shift bar 44 arranged along the outer side of the frame plate 12 and having its inner end connected with a rock arm 45 on the adjacent outer end of the brake shaft 38 while the outer end of this shifting bar is provided with a handle or finger piece 46, as best shown in Figs. 2 and 6. The outer part of the shifting bar is guided on the adjacent part of the frame plate 12 by means which preferably consist of a guide loop 47 which embraces the outer part of the shifting bar and is provided with legs 48 passing through a pair of openings formed in the frame plate 12 and terminate at their inner ends in toes 49 which are clinched against the inner side of the respective frame plate, as best shown in Fig. 10.

The longitudinal movement of the shifting bar is limited in both directions and thereby arrests the rocking movement of the brake shaft in either direction so that upon pressing a finger or the thumb of the hand against the handle 46 the brake shaft will be turned in one direction for moving the brake cam 35 out of the path of the tappet 36 and also increase the tension on the spring 42. Upon releasing the hand pressure against the handle 46 of the shifting bar, the resilience of the spring 42 will cause the brake shaft to be turned in the opposite direction a sufficient extent to bring the brake cam into the path of the tappet, during which movement the shifting bar is moved outwardly. The means for thus arresting the rocking movement of the brake cam and its shaft and also the longitudinal movement of the shifting bar preferably consist of a stop pin 50 which is screwed into the intermediate part of the shifting bar 44 and projects into a groove 51 in the adjacent frame plate 12, the ends 52, 53 of said groove serving as stops which are adapted to be engaged by the stop pin 50 at opposite ends of the reciprocating movement of the shifting bar and thus limit the throw of the brake cam 35 into and out of its operative position relative to the tappet of the traveler or carriage.

For the purpose of varying the extent of the rocking movement which is imparted by the brake cam to the traveler or carriage and thus render it possible to adjust the intermittent resistance or braking effect which is imparted to the rotary movement of the spool in accordance with varying conditions or the desires of the fisherman who is handling the reel and rod, means are provided for adjusting the tappet 36 so that the same projects to a greater or lesser extent into the path of the brake cam. Although these adjusting means may be varied, the same are preferably constructed as follows:

The tappet in the present case preferably has the form of a roller which is pivoted by a pin 54 on a slide 55 which is capable of transverse adjustment on a guide face 56 formed in the adjacent part of the carriage or traveler. The transverse movement of this slide is preferably effected by means of an adjusting screw 57, working in a threaded opening on the slide and provided at its inner end with a head 58 which engages with an enlarged socket 59 in the adjacent part of the traveler and a reduced neck 60 connecting this head with the body of the screw and arranged in a reduced notch 61 extending into the socket 59 of the traveler or carriage. By this means the adjusting screw upon being turned by means of a screw driver or other implement will cause the slide to move transversely of the screw shaft and carry the tappet 35 into the desired position relative to the path of the brake cam but the adjusting screw will be held against longitudinal movement. After the tappet has been shifted into the desired position the same may be held rigidly in place by means of a clamping screw 62 passing through a slot 63 in the slide 55 and engaging a threaded opening in the traveler or carriage 30, as best shown in Fig. 7.

In using this fishing reel the line is cast while the brake cam is in its operative position and as the spool at this time has the greatest amount of line wound thereon and the body of the line is therefore of the largest diameter, the unwinding rotation of the spool pays out a comparatively great length of line which, however, gradually decreases in length as the diameter of the body of the line diminishes. During the initial part of the unwinding movement of the spool due to the casting operation which is most powerful at the beginning of the cast, more line is liable to be payed out from the spool than is carried away by the bait or plug which has been cast, thereby causing the spool to overrun and producing a back-lash which will carry the excess amount of line in the form of one or more loops around the body of line on the spool instead of paying the same out, thereby producing a tangle or snarl in the line which, interrupts the normal use of the reel until the tangle or snarl has been straightened out. In using the present anti-back-lash device the operator takes his hand off the handle 46 during the first part of casting the line so as to permit the cam 35 to stand in the path of the tappet 36 whereby the tappet during each stroke of its reciprocating movement will engage the brake cam and thereby cause a momentary braking effect to be transmitted to the spool, which braking effect is removed after the tappet clears the brake cam, so that an alternating brake applying and brake releasing action on the spool is obtained which serves to slow up or retard the unwinding motion of the spool and thereby prevent an excess amount of line from being payed out during the initial part of throwing the bait or plug.

After the initial part of the line has been unreeled from the spool the power of the cast has been partly spent and at this time the operator presses inwardly on the shifting bar 44 so as to move the brake cam out of the path of the tappet on the traveler, thereby enabling the latter to effect its reciprocating movement without intermittent interruption whereby the reel is free and permitted to pay out the line to the fullest extent during final part of the cast without any interference from the anti-back-lash device.

The duration of the intermittent braking effect on the spool while initially unwinding the line from the spool upon making the cast, and the duration of the inoperative position of this braking device while the line is effecting the latter part of its unwinding action from the spool are wholly within the control of the fisherman and may be changed after some experience in order to obtain the best results. If the fisherman desires to obtain greater distance upon casting the bait the tappet can be adjusted so that the brake cam will only bear lightly against the tappet and thus only produce a comparatively light intermittent retardation of the unwinding movement of the reel, whereas an adjustment of the tappet so that it projects a greater extent into the path of the brake cam will cause the braking effect on the spool to become more pronounced and thereby reduce the length of throw of the bait when casting the same. It is therefore possible to adjust this anti-back-lash device to suit the strength of throw of different fishermen and adapt the reel to meet other conditions.

Although the brake cam in the present case is shown mounted on the central part of the brake shaft, it is obvious that the same can be mounted elsewhere on the latter relative to the length of the same, but it is preferable to mount this cam midway of the length of this brake shaft inasmuch as the tappet upon engaging the same is in full motion and therefore is able to pass over this cam without unduly stopping the unwinding operation from the reel but instead merely slowing up such unwinding operation.

As a whole this anti-back-lash device is very simple in construction and can be readily embodied in fishing reels of standard type now marketed, the same can be built compactly into fishing reels without interfering with other mechanism, and the same can be used by unskilled fishermen without liability of producing back-lash of the line, thereby avoiding interference with a thorough enjoyment of this sport.

I claim as my invention:

1. A fishing reel comprising a frame, a line spool rotatably mounted on said frame, a double-thread screw mounted on said frame and operatively connected with said spool, a traveler running lengthwise on said screw and having a guide loop for directing the line relative to said spool, a longitudinal guide bar mounted on the frame and engaged by said guide loop, and means for intermittently turning said traveler on said screw and increasing the frictional engagement of said guide loop with said guide bar.

2. A fishing reel comprising a frame, a line spool rotatably mounted on said frame, a double-thread screw mounted on said frame and operatively connected with said spool, a traveler running lengthwise on said screw and having a guide loop for directing the line relative to said spool, a longitudinal guide bar mounted on the frame and engaged by said guide loop, means for intermittently turning said traveler on said screw and increasing the frictional engagement of said guide loop with said guide bar including a braking cam mounted on the frame, and a tappet arranged on said traveler and adapted to engage with said cam during the longitudinal movement of the traveler on said screw.

3. A fishing reel comprising a frame, a line spool rotatably mounted on said frame, a double-thread screw mounted on said frame and operatively connected with said spool, a traveler running lengthwise on said screw and having a guide loop for directing the line relative to said spool, a longitudinal guide bar mounted on the frame and engaged by said guide loop, means for intermittently turning said traveler on said screw and increasing the frictional engagement of said guide loop with said guide bar including a braking cam mounted on the frame, a tappet arranged on said traveler and adapted to engage with said cam during the longitudinal movement of the traveler on said screw and shifting means for moving said cam into and out of the path of said tappet.

4. A fishing reel comprising a frame, a line spool rotatably mounted on said frame, a double-thread screw mounted on said frame and operatively connected with said spool, a traveler running lengthwise on said screw and having a guide loop for directing the line relative to said spool, a longitudinal guide bar mounted on the frame and engaged by said guide loop, means for intermittently turning said traveler on said screw and increasing the frictional engagement of said guide loop with said guide bar including a braking cam mounted on the frame, a tappet arranged on said traveler and adapted to engage with said cam during the longitudinal movement of the traveler on said screw, and shifting means for moving said cam into and out of the path of said tappet including a rock shaft mounted on said frame and supporting said cam.

5. A fishing reel comprising a frame, a line spool rotatably mounted on said frame, a double-thread screw mounted on said frame and operatively connected with said spool, a traveler running lengthwise on said screw and having a guide loop for directing the line relative to said spool, a longitudinal guide bar mounted on the frame and engaged by said guide loop, means for intermittently turning said traveler on said screw and increasing the frictional engagement of said guide loop with said guide bar including a braking cam mounted on the frame, a tappet arranged on said traveler and adapted to engage with said cam during the longitudinal movement of the traveler on said screw, shifting means for moving said cam into and out of the path of said tappet including a rock shaft mounted on said frame and supporting said cam, spring means for turning said rock shaft in the direction for bringing said cam into the path of said tappet, and manually operated means for turning the rock shaft in the direction for moving said cam out of the path of said tappet.

6. A fishing reel comprising a frame, a line spool rotatably mounted on said frame, a double-thread screw mounted on said frame and operatively connected with said spool, a traveler running lengthwise on said screw and having a guide loop for directing the line relative to said spool, a longitudinal guide bar mounted on the frame and engaged by said guide loop, means for intermittently turning said traveler on said screw and increasing the frictional engagement of said guide loop with said guide bar including a braking cam mounted on the frame, a tappet arranged on said traveler and adapted to engage with said cam during the longitudinal movement of the traveler on said screw, shifting means for moving said cam into and out of the path of said tappet including a rock shaft mounted on said frame and supporting said cam and provided at its opposite ends with rock arms, a spring connecting one of the rock arms with the frame, and a shifting bar guided on the frame and connected at one end with the other rock arm and provided at its other end with a handle.

7. A fishing reel comprising a frame, a line spool rotatably mounted on said frame, a double-thread screw mounted on said frame and operatively connected with said spool, a traveler running lengthwise on said screw and having a guide loop for directing the line relative to said spool, a longitudinal guide bar mounted on the frame and engaged by said guide loop, means for intermittently turning said traveler on said screw and increasing the frictional engagement of said guide loop with said guide bar including a braking cam mounted on the frame, a tappet arranged on said traveler and adapted to engage with said cam during the longitudinal movement of the traveler on said screw, shifting means for moving said cam into and out of the path of said tappet including a rock shaft mounted on said frame and supporting said cam and provided at its opposite ends with rock arms, a spring connecting one of the rock arms with the frame, a shifting bar guided on the frame and connected at one end with the other rock arm and provided at its other end with a handle or finger piece, and means for limiting the turning movement of said rock shaft.

8. A fishing reel comprising a frame, a line spool rotatably mounted on said frame, a double-thread screw mounted on said frame and operatively connected with said spool, a traveler running lengthwise on said screw and having a guide loop for directing the line relative to said spool, a longitudinal guide bar mounted on the frame and engaged by said guide loop, means for intermittently turning said traveler on said screw and increasing the frictional engagement of said guide loop with said guide bar including a braking cam mounted on the frame, a tappet arranged on said traveler and adapted to engage with said cam during the longitudinal movement of the traveler on said screw, shifting means for moving said cam into and out of the path of said tappet including a rock shaft mounted on said frame and supporting said cam and provided at its opposite ends with rock arms, a spring connecting one of the rock arms with the frame, a shifting bar guided on the frame and connected at one end with the other rock arm and provided at its other end with a handle, and means for limiting the turning movement of said rock shaft consisting of a stop pin arranged on the shifting bar and adapted to engage opposite ends of a groove in the adjacent part of the main frame.

9. A fishing reel comprising a frame, a line spool rotatably mounted on said frame, a double-thread screw mounted on said frame and operatively connected with said spool, a traveler running lengthwise on said screw and having a guide loop for directing the line relative to said spool, a longitudinal guide bar mounted on the frame and engaged by said guide loop, means for intermittently turning said traveler on said screw and increasing the frictional engagement of said guide loop with said guide bar including a braking cam mounted on the frame, a tappet arranged on said traveler and adapted to engage with said cam during the longitudinal movement of the traveler on said screw and means whereby said tappet is connected with said traveler for adjusting the same relative to said cam.

10. A fishing reel comprising a frame, a line spool rotatably mounted on said frame, a double-thread screw mounted on said frame and operatively connected with said spool, a traveler running lengthwise on said screw and having a guide loop for directing the line relative to said spool, a longitudinal guide bar mounted on the frame and engaged by said guide loop, means for intermittently turning said traveler on said screw and increasing the frictional engagement of said guide loop with said guide bar including a braking cam mounted on the frame, a tappet arranged on said traveler and adapted to engage with said cam during the longitudinal movement of the traveler on said screw, means whereby said tappet is connected with said traveler for adjusting the same relative to said cam including a slide movable transversely on said traveler and supporting said tappet, and an adjusting screw connecting said slide and traveler.

VICTOR E. PEARSON.